United States Patent [19]
Gute

[11] 3,730,217
[45] May 1, 1973

[54] CHECK VALVE
[75] Inventor: Loren R. Gute, Dayton, Ohio
[73] Assignee: General Motors Corporation, Detroit, Mich.
[22] Filed: May 19, 1971
[21] Appl. No.: 144,893

[52] U.S. Cl. .........137/512.4, 15/250.01, 137/512.3, 137/525.1, 417/560, 417/566
[51] Int. Cl. .....................F16k 15/14, F04b 21/02
[58] Field of Search.................417/560, 566, 567, 417/571; 137/512, 512.15, 512.3, 512.4, 525, 525.1, 217, 218; 15/250.02, 250.16, 250.2; 222/490

[56] References Cited

UNITED STATES PATENTS

| | | | |
|---|---|---|---|
| 2,537,241 | 1/1951 | Smith | 417/560 |
| 3,010,476 | 11/1961 | Ziegler | 137/512.4 |
| 3,084,371 | 4/1963 | Hulverson | 15/250.02 |
| 3,097,608 | 7/1963 | Deibel et al. | 15/250.02 X |
| 3,159,176 | 12/1964 | Russell et al. | 137/525.1 X |
| 3,434,808 | 3/1969 | Pobst | 417/566 X |
| 3,527,242 | 9/1970 | Ansite | 137/512.4 X |
| 3,527,551 | 9/1970 | Kutik et al. | 417/560 |

FOREIGN PATENTS OR APPLICATIONS

| | | | |
|---|---|---|---|
| 609,275 | 2/1935 | Germany | 137/218 |

*Primary Examiner*—Martin P. Schwadron
*Assistant Examiner*—David J. Zobkiw
*Attorney*—J. L. Carpenter and R. L. Phillips

[57] ABSTRACT

A check valve having an elastic member that provides sealing between a passage that leads to a chamber and a passage that leads from the chamber and further operates to provide check valve operation for directing flow from one of these passages to the chamber and also cooperates with additional check valve structure to direct flow from the chamber to the other passage.

2 Claims, 7 Drawing Figures

Patented May 1, 1973

INVENTOR.
Loren R. Gute
BY
Ronald L. Phillips
ATTORNEY

INVENTOR.
Loren R. Gute
BY
Ronald L. Phillips
ATTORNEY

CHECK VALVE

This invention relates to check valves and more particularly to check valves that also provide sealing.

In automobile windshield washer pumps, for example, it is common practice to employ check valves to control connection between an inlet passage and the pump chamber and also between this chamber and an outlet passage. The check valves are normally used only for valve operation with other structure used to provide the necessary sealing between the inlet and outlet passages in arrangements where there would otherwise be a leak path therebetween. It has further been found that in such check valve usage, the outlet controlling check valve should close without assisting back pressure to insure that the pump will prime. It is also desirable that the total arrangement including the sealing provision be simple, have few parts and be easily assembled.

In one embodiment according to the present invention, there is provided for use with a windshield washer pump a check valve arrangement comprising a valve body at one end of the pump chamber. In the valve body there is provided an inlet passage for directing fluid to the chamber and also an outlet passage for directing fluid from the chamber. An elastic valve member is snap fittingly secured to the valve body with such securing also providing sealing between the inlet and outlet passages. The valve member is arranged to normally close the chamber to the inlet passage and is deflectable to open the inlet passage to the chamber to thus permit flow to the chamber and prevent flow in the opposite direction. The valve member also has check valve structure for preventing flow from the outlet passage to the chamber while permitting flow in the opposite direction. This latter check valve structure in one embodiment is provided by a nipple on the elastic member that has a fluid passage with one end that is formed so as to be normally closed. In addition, the valve body has structure for cooperating with this nipple to provide positive closure to prevent flow from the outlet passage to the chamber while permitting the nipple's passage to open to permit flow in the opposite direction from the chamber to the outlet passage whereby this check valve will seal without back pressure to provide for pump priming.

An object of the present invention is to provide a new and improved check valve.

Another object is to provide a check valve arrangement that operates to direct flow from an inlet passage to a chamber and from the chamber to an outlet passage and also provides sealing between these passages.

Another object is to provide a check valve arrangement that operates to connect an inlet passage to a chamber and the chamber to an outlet passage, provide sealing between these passages and with the outlet controlling check valve having an assured closure independent of back pressure.

Another object is to provide a check valve arrangement for controlling the connections between the inlet and outlet passages and the chamber of a windshield washer pump with the inlet passage being controlled by an elastic valve member that by its securing provides sealing between these passages and is deflectable to open the inlet passage to the chamber and further having check valve structure for cooperating with additional check valve structure to permit flow from the chamber to the outlet passage while preventing flow in the opposite direction and being normally positively closed independently of back pressure.

These and other objects of the present invention will be more apparent from the following description and drawings in which.

Figure 1:
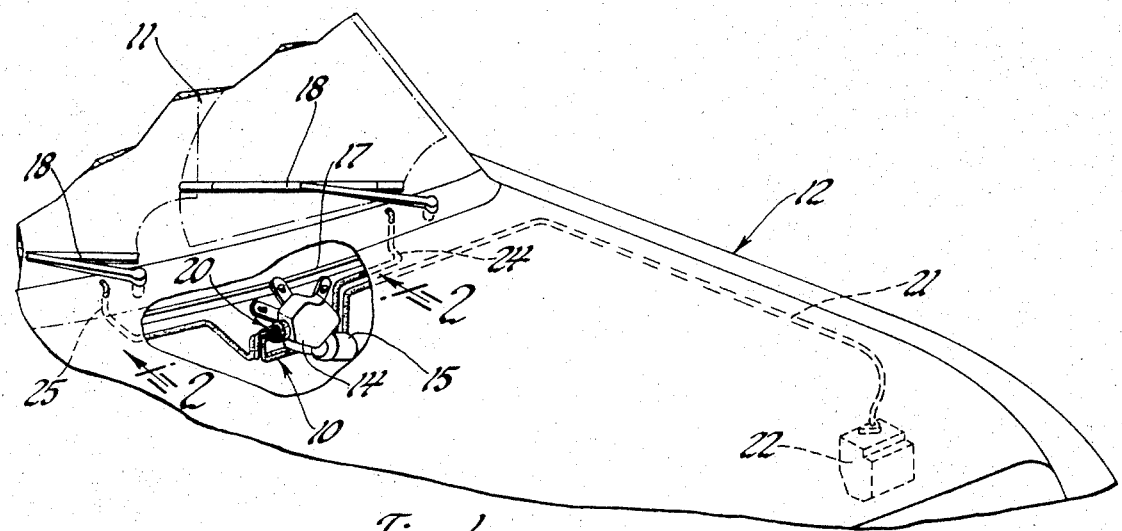
FIG. 1 is a fragmentary perspective view of an automobile having windshield cleaning apparatus including a washer pump in which is incorporated one embodiment of a check valve arrangement according to the present invention.

Referring to FIG. 1, the check valve arrangement according to the present invention is illustrated for use in a windshield cleaning apparatus 10 for cleaning a windshield 11 of an automobile 12. The windshield cleaning apparatus 10 generally comprises a wiper unit 14 that is powered by a motor 15 to operate through linkage 17 to stroke a pair of wipers 18 across the windshield 11. The apparatus 10 further includes a washer pump 20 that is also powered by the motor 15 and is connected by a conduit 21 to draw fluid from a washer fluid reservoir 22 and deliver this fluid by conduits 24 and 25 to wash the windshield 11. The apparatus thus far described is conventional and may be of the type disclosed in U.S. Pat. No. 3,503,091 issued to Petry et al. and entitled "Fast Response Windshield Washer."

Figure 2:
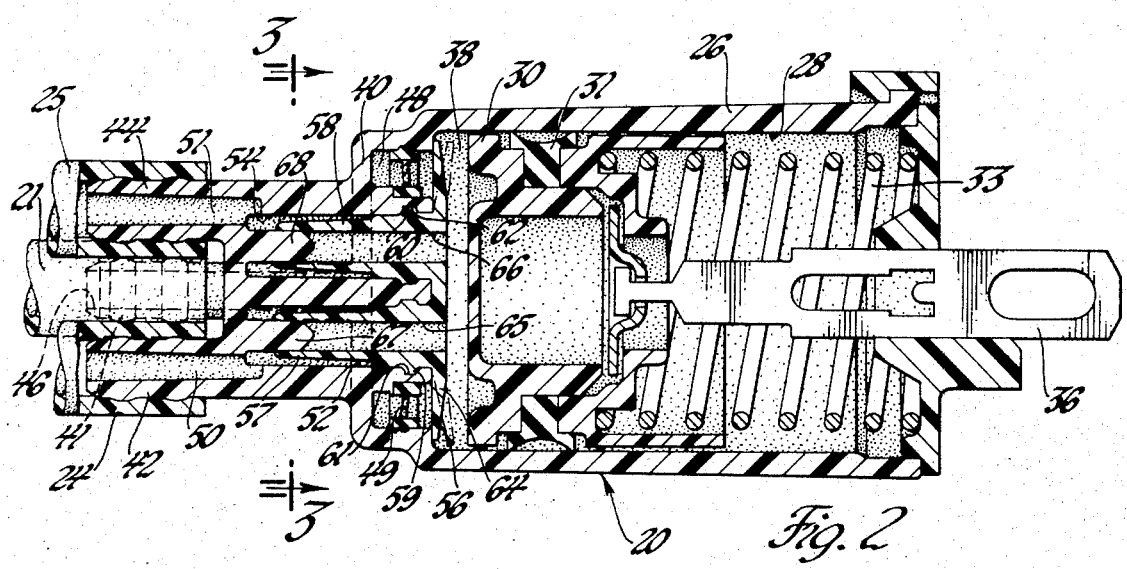
FIG. 2 is an enlarged fragmentary sectional view of the washer pump including the check valve arrangement taken along line 2—2 in FIG. 1.

One embodiment of the check valve arrangement according to the present invention is incorporated in the washer pump 20 which, as shown in FIG. 2, comprises a plastic pump housing 26 that is a part of apparatus 14 and has a cylinder 28 in which is slideably mounted a piston assembly 30. The piston 30 carries a seal 31 that engages the cylinder 28 and a spring 33 is arranged to bias the piston 30 leftward as viewed in FIG. 2. Piston 30 is connected by a rod 36 to be pulled rightward against the spring force by power supply from the motor 15. With this arrangement, the rod 36 moves the piston 30 rightward to effect a suction or intake stroke and the spring 33 operates to move the piston 30 leftward to effect an exhaust or discharge stroke, the intake stroke serving to expand a chamber 38 at the left-hand end of the cylinder 28 and the discharge stroke serving to compress this chamber. For further details of the connection of the rod 36 with the apparatus 14, reference may be made to the aforementioned Petry et al. patent.

Figure 3:
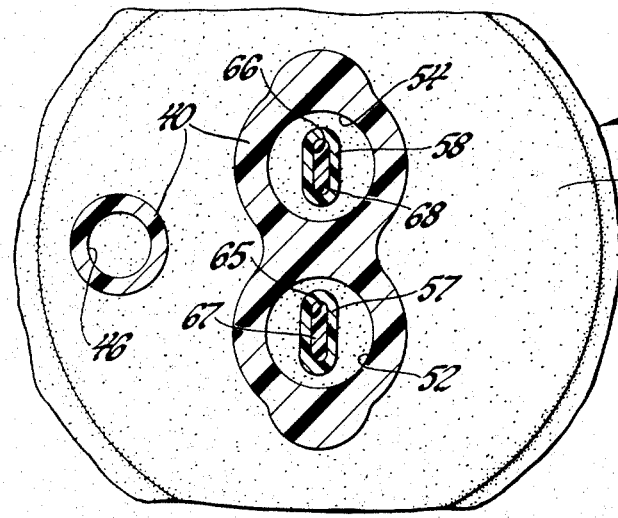
FIG. 3 is an enlarged view taken along line 3—3 in FIG. 2.

Describing now the connections of the washer system and the valve structure therefor, the pump housing 26 has an end wall 40 that includes an inlet nipple 41 and a pair of outlet nipples 42 and 44. The conduit 21 leading from the washer reservoir 22 is fitted on the inlet nipple 41 which has a central passage 46. Passage 46 is connected to an annular passage 48 which has an annular filter 49 therein and extends to the pump chamber 38. The conduits 24 and 25 which are for delivering fluid from the pump to the windshield are fitted to the nipples 42 and 44, respectively. Nipples 42 and 44 have central passages 50 and 51 which are connected to passages 52 and 54. Passages 52 and 54 extend to the pump chamber 38 and are circular in cross section as shown in FIG. 3.

According to the present invention there is provided a one-piece valve member 56 of elastic material having a pair of nipples 57 and 58 which are received in the passages 52 and 54, respectively. The valve member 56 is retained in place by annular ribs 59 and 60 which are formed on the exterior circular base portions of the nipples 57 and 58, respectively, and are snap fittingly received in annular recesses or grooves 61 and 62 in the passages 52 and 54 adjacent the pump chamber 38. This snap fitting engagement with the end wall 40 holds the valve member 56 in place and also provides sealing between inlet passage 48 and outlet passages 52 and 54. The valve member 56 further has an outer annular or umbrella portion 64 which overlies the annular inlet passage 48. The annular portion 64 is deflectable between the solid position shown in FIG. 2 which is the closed position and the dashed line position which is the open position. The annular portion 64 is normally in the closed position which occurs when the pump is not being operated and when the piston is on its discharge stroke. During the suction stroke, the annular portion 64 is deflected to the open position to permit fluid to be drawn from the reservoir 22 through the conduit 21 and passages 46 and 48 and through filter 49 into the chamber 38. Then when the piston 30 is stroked to compress the chamber 38, the fluid pressure produced in this chamber together with the elasticity of the valve member returns the annular portion 64 to its normal closed position. Thus, the annular portion 64 of the valve element 56 serves as a check valve in that it allows for fluid to be drawn into the chamber 38 but prevents the fluid from being displaced thereafter from the chamber 38 into the inlet passage 48.

The valve member 56 further has a pair of check valves provided by the nipples 57 and 58 which have central passages 65 and 66 for connecting chamber 38 to the passages 52 and 54, respectively. The nipples 57 and 58 at their left-hand ends are formed to the shape of duckbills whose lips receive pins 67 and 68 that are integral with the end wall 40 and project rightward from the left-hand end of the passages 52 and 54 as viewed in FIG. 2. As shown in FIG. 3, the pins 67 and 68 are rectangular in cross section and the nipples 57 and 58 have a similar cross section at their lip ends. The nipple passages 65 and 66 in a free state are smaller in size than the pins 67 and 68 so that the nipple lips normally sealingly grip the pins to prevent flow through the nipple passages. Then when the piston 30 is stroked to compress the chamber 38, the nipples 57 and 58 are expanded radially outward from the pins 67 and 68 by the fluid pressure in passages 65 and 66 to permit fluid to be displaced from the chamber 38 into the outlet passages 52 and 54. Alternatively, the nipples 57 and 58 contract against the pins 67 and 68 to prevent fluid from flowing in the opposite direction from the pump's outlets to the chamber 38 when the piston is on its suction stroke. Thus, the check valves provided by the nipples 57 and 58 and the cooperating pins 67 and 68 are closed with or without back pressure.

Figure 4:
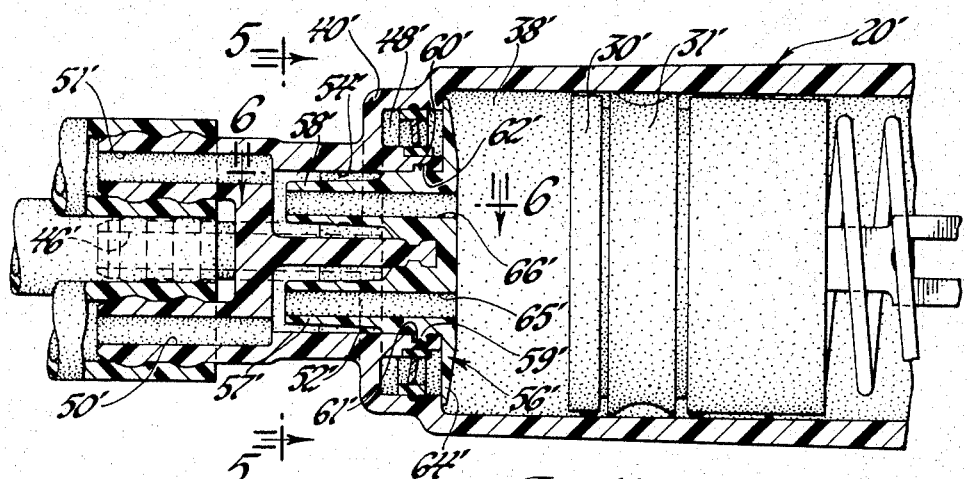
FIG. 4 is a view similar to FIG. 2 of another embodiment of the check valve arrangement according to the present invention.

Referring now to the FIG. 4 embodiment, parts similar to those shown in FIG. 2 are designated by the same numerals only primed. The inlet passageway provided by passages 46' and 48' is for directing washer fluid to the pump chamber 38' and the two outlet passageways provided by passages 50' and 52' and by passages 51' and 54' are for directing fluid from the pump chamber. The valve member 56' like in the FIG. 2 embodiment, is snap fittingly secured in the outlet passages 52' and 54' by the nipple ribs 59' and 60' being received in accommodating annular grooves 61' and 62' with the outer annular portion 64' serving to provide check valve operation for permitting fluid to flow from the inlet passage 48' into the chamber 38' but preventing reverse flow.

Figure 5:
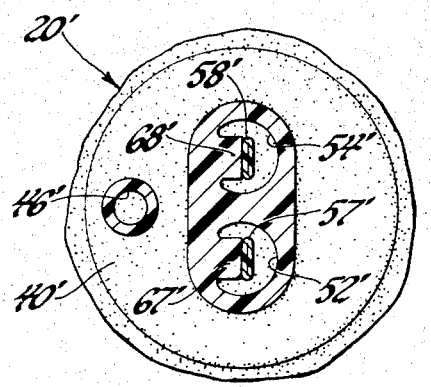
FIG. 5 is a view taken along the line 5—5 in FIG. 4.
Figure 6:
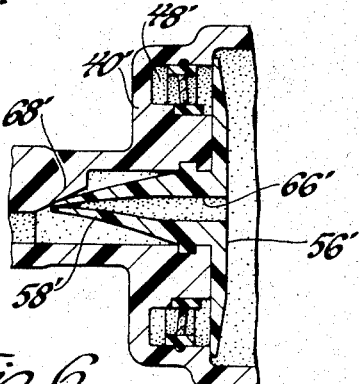
FIG. 6 is a view taken along the line 6—6 in FIG. 4.

The valve member 56' similarly has the nipples 57' and 58' extending into the outlet passages 52' and 54' with the nipples at their left-hand ends being generally rectangular in cross section and closed as shown in FIG. 5. In the FIG. 4 embodiment, however, the valve closure portions 67' and 68' on the end wall 40' extend from one side of the passages 52' and 54' opposite one flat side of the nipples instead of from the left-hand ends thereof. With this arrangement, the nipples 57' and 58' on assembly of the valve member 56' are deflected in a direction transverse to the nipple passages 65' and 66' as shown in FIGS. 5 and 6 so that there is provided a side thrust in addition to the inherent closing ability of the nipples to force the lips together to assure that the outlet check valves are closed regardless of whether there is back pressure. When pressure is supplied to passages 65' and 66', these passages are opened by the nipple lips separating to permit flow from chamber 38' to the outlet passages 52' and 54'.

Figure 7:
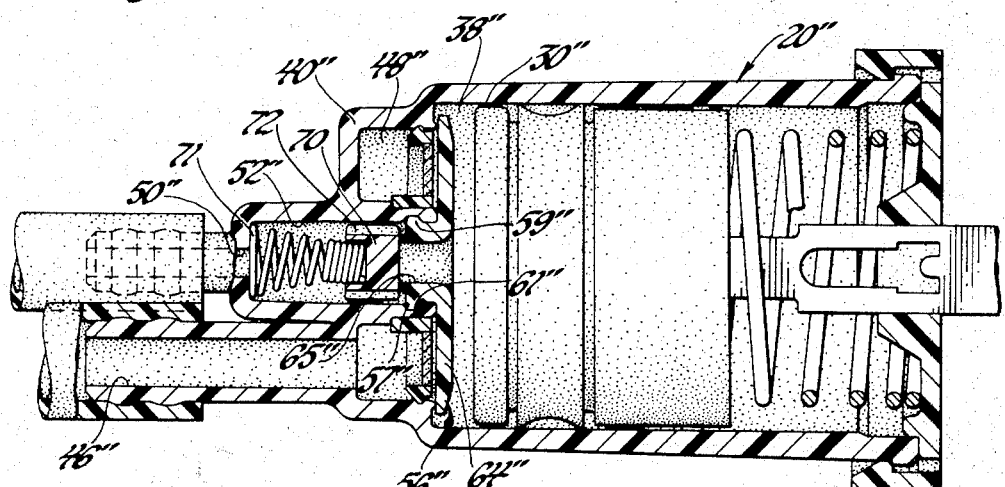
FIG. 7 is a view similar to FIG. 2 of another embodiment of the check valve arrangement according to the present invention.

Referring to the FIG. 7 embodiment, parts similar to those shown in FIG. 2 are designated by the same numerals only double primed and added parts have new numbers. In the FIG. 7 arrangement, washer fluid is directed to the pump chamber 38" by the inlet passageway provided by passages 46" and 48" and fluid is directed from the pump chamber 38" by the double outlet passageway provided by passages 50" and 52", the double outlet passageway in this arrangement being axially aligned with the valve member 56"'. The valve member 56" in this instance has only the one nipple 57" whose annular locking rib 59" is received in accommodating annular groove 61" passage 52" to snap fittingly secure the valve member 56" in the end wall 40". In this arrangement the single snap fitting engagement thus holds the valve member 56" in place and also provides a seal between the inlet and outlet passageways like in the previously described arrangements. Also similar to the previous arrangements, the valve member 56" has annular outer portion 64" which normally closes the inlet passage 48" from the chamber 38" and on the suction stroke yields or flexes to permit fluid flow to the chamber 38" to charge the pump. Then when the pump is stroked to deliver fluid, the annular portion 64" assumes the closed position shown to prevent flow in the reverse direction.

The FIG. 7 arrangement differs from the other arrangements primarily in the outlet check valve structure which is provided by a movable check valve member 70 that is located in the outlet passage 52″ and is biased by a coil spring 71 to seat on the left-hand end of nipple 57″ as shown to close the passageway 65″ which would occur when the pump is not operating or is on its suction stroke. Then when the pump is operated to discharge fluid the pressure in the chamber 38″ acts in passage 65″ on the exposed end face of the valve member 70 to urge it leftward against the spring 71 to an open position. Fluid is then delivered out through the passage 65″ past valve element 70 via axially extending grooves 72 in this valve element to the outlet passage 52″. Thus in this valve arrangement the outlet check valve is spring biased to its closed position so that no back pressure is required to assure valve closure and thereby assure that the washer pump will prime.

The above described embodiments are illustrative of the invention which may be modified within the scope of the appended claims.

I claim:

1. A check valve arrangement comprising a valve body having a chamber, an inlet passage for directing fluid to said chamber, an outlet passage for directing fluid from said chamber, an elastic valve member having nipple means received in said outlet passage, said nipple means and said valve body having cooperating rib and groove means for securing said valve member to said valve body and also providing sealing between said passages, said nipple means having a valve passage therethrough for connecting said chamber and said outlet passage, said nipple means having lips that normally inherently sealingly engage to close said valve passage and are yieldable to pressure in said valve passage from said chamber to open said valve passage, said valve member having a deflectable portion for normally closing said chamber from said inlet passage to prevent flow from said chamber to said inlet passage and deflectable to open said inlet passage to said chamber to permit flow from said inlet passage to said chamber, said valve body having valve closure means engaging and deflecting said nipple means in a direction transverse to said valve passage to assist in closing said lips to prevent flow from said outlet passage to said chamber and said nipple means deflectable by pressure in said valve passage from said chamber to open said chamber through said valve passage to said outlet passage to permit flow from said chamber to said outlet passage.

2. A check valve arrangement comprising a valve body having a chamber, an inlet passage for directing fluid to said chamber, an outlet passage for directing fluid from said chamber, an elastic valve member having nipple means received in said outlet passage, said nipple means and said valve body having cooperating rib and groove means for securing said valve member to said valve body and also providing sealing between said passages, said nipple means having a valve passage therethrough for connecting said chamber and said outlet passage, said nipple means having lips that normally inherently sealingly engage to close said valve passage and are yieldable to pressure in said valve passage from said chamber to open said valve passage, said valve member having a deflectable portion for normally closing said chamber from said inlet passage to prevent flow from said chamber to said inlet passage and deflectable to open said inlet passage to said chamber to permit flow from said inlet passage to said chamber, said valve body having valve closure means extending transverse to said valve passage and said lips into an interference position with said nipple means to externally engage and deflect said nipple means in a direction transverse to said valve passage to assist in closing said lips to prevent flow from said outlet passage to said chamber and said nipple means deflectable by pressure in said valve passage from said chamber to open said chamber through said valve passage to said outlet passage to permit flow from said chamber to said outlet passage.

* * * * *